Aug. 8, 1939.　　　　J. H. SIMMS　　　　2,168,688
ENLARGING APPARATUS FOR MOVIE FILMS
Filed Nov. 15, 1938　　　3 Sheets-Sheet 1
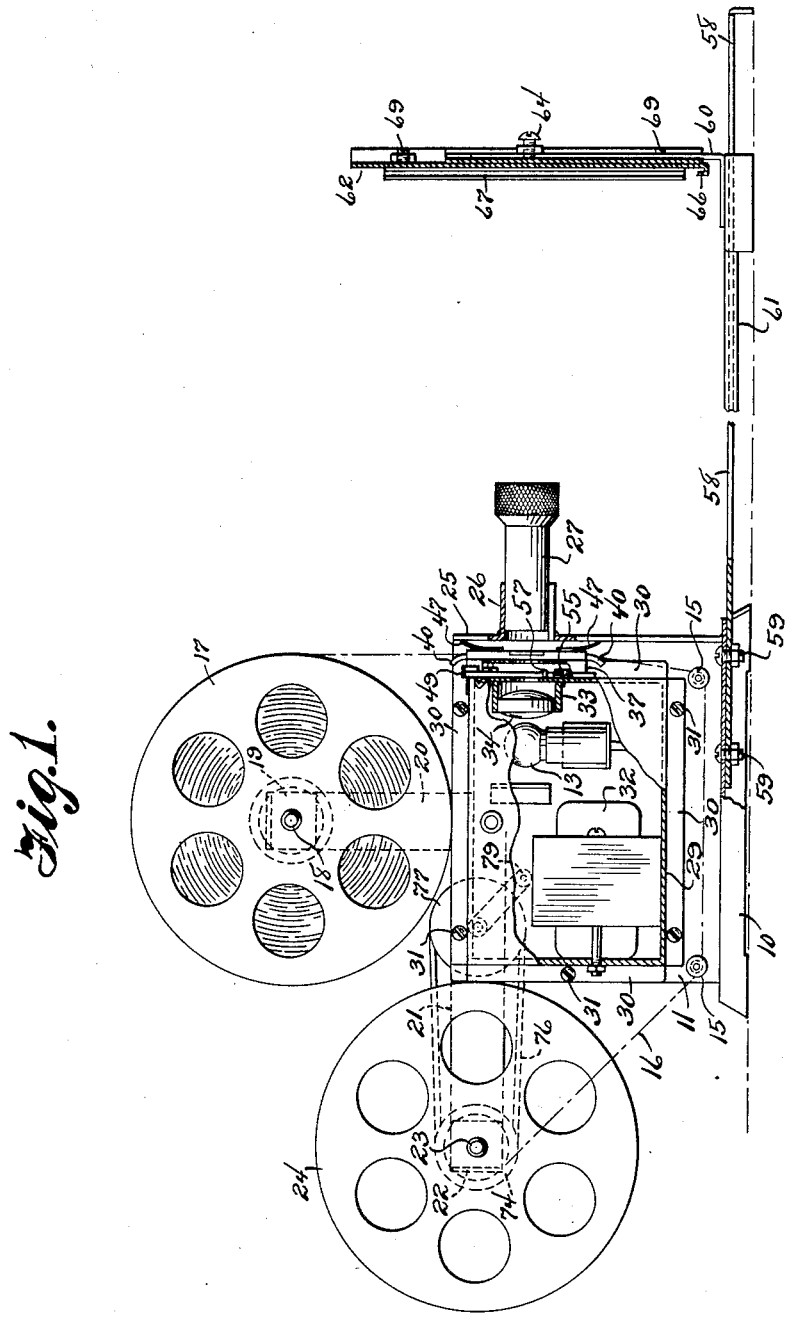
James H. Simms INVENTOR
BY Victor J. Evans & Co.
ATTORNEYS Aug. 8, 1939.   J. H. SIMMS   2,168,688
ENLARGING APPARATUS FOR MOVIE FILMS
Filed Nov. 15, 1938   3 Sheets-Sheet 2
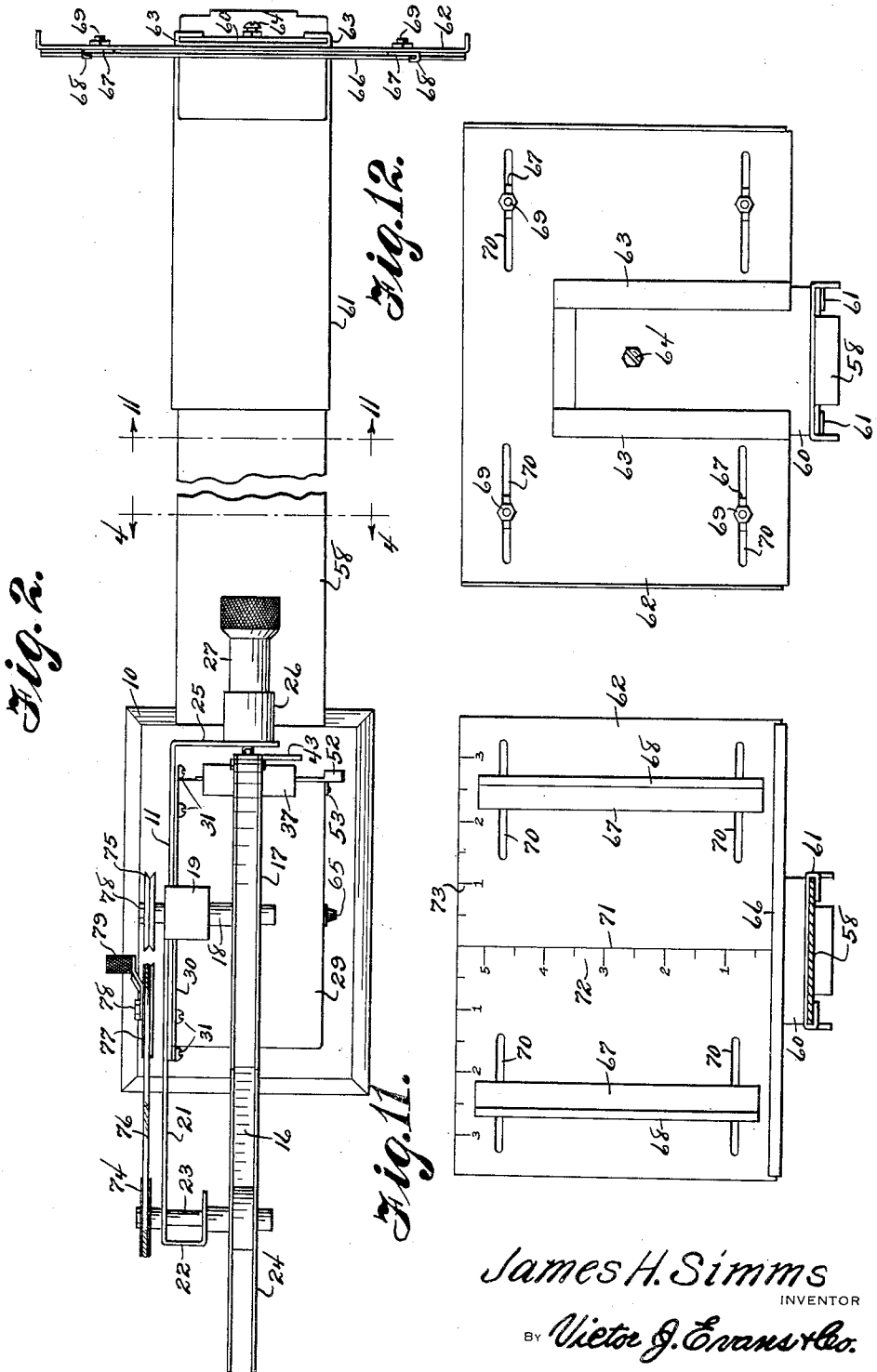

Aug. 8, 1939.  J. H. SIMMS  2,168,688
ENLARGING APPARATUS FOR MOVIE FILMS
Filed Nov. 15, 1938   3 Sheets-Sheet 3
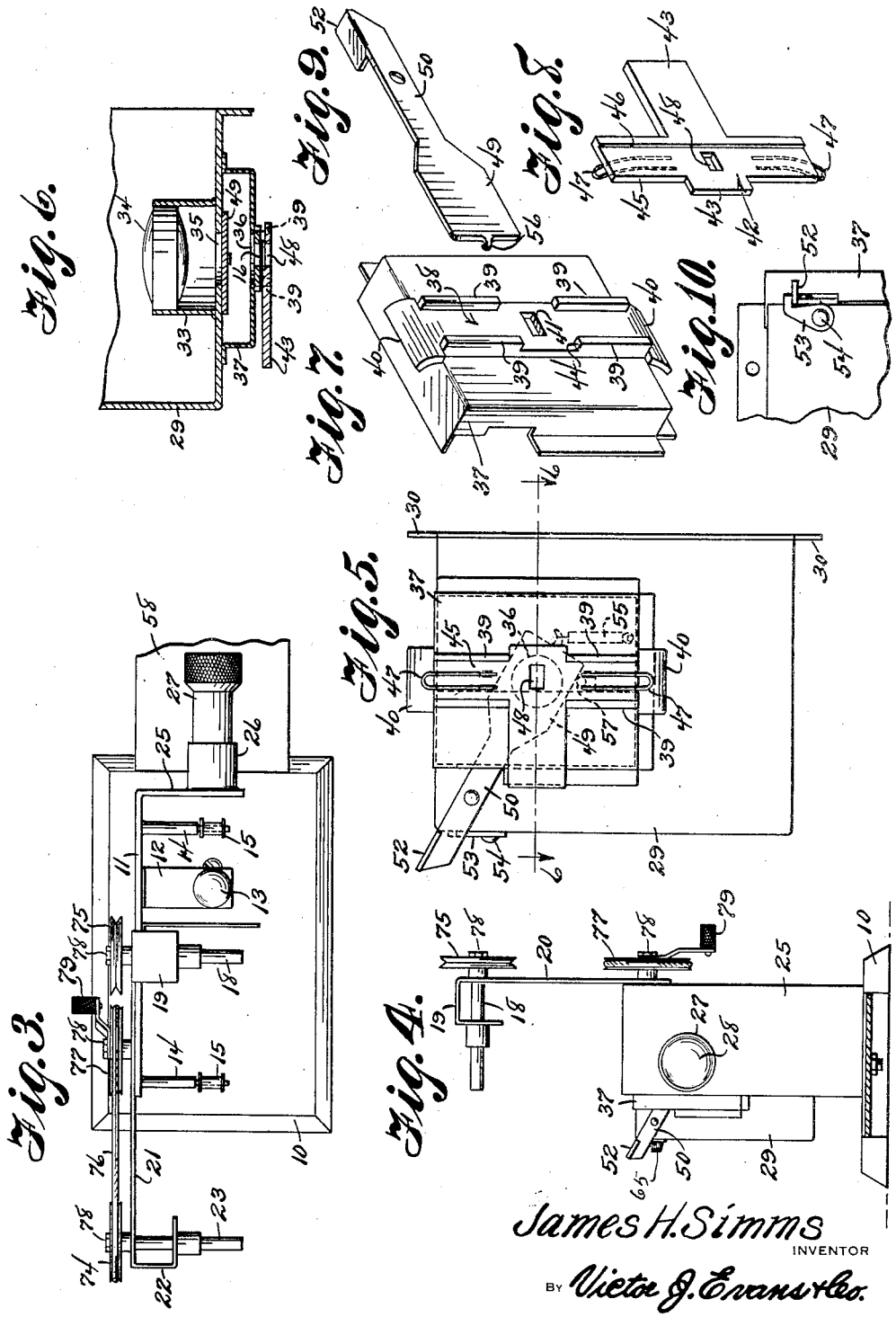
James H. Simms
INVENTOR
BY Victor J. Evans & Co.
ATTORNEYS Patented Aug. 8, 1939

2,168,688

UNITED STATES PATENT OFFICE 2,168,688

ENLARGING APPARATUS FOR MOVIE FILMS

James H. Simms, St. Albans, W. Va.

Application November 15, 1938, Serial No. 240,552

2 Claims. (Cl. 88—24)

This invention relates to enlarging apparatus for movie films and has for an object to provide apparatus for projecting a still picture from a movie frame with just the proper intensity of light to expose the direct positive paper in about three seconds.

A further object is to provide apparatus of this type which will produce enlarged prints from an individual 8 m. m. or 16 m. m. movie frame.

A further object is to provide apparatus of this type which will employ essentially only a low candle power light, a projection lens, a shutter for controlling the exposure, a condensing lens and a rewind device for handling the film.

A further object is to provide apparatus of this type which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a side elevation of enlarging apparatus for movie film, constructed in accordance with the invention.

Figure 2 is a plan view of the apparatus shown in Figure 1.

Figure 3 is a plan view of the apparatus with the film reels, housing for the mechanism, film gate, and condensing lens removed.

Figure 4 is a cross sectional view taken on the line 4—4 of Figure 2 showing the projecting mechanism in front elevation, with the film reels removed.

Figure 5 is a detail front elevation showing the shutter, film gate, spring pressed platen for holding the film flat, and box upon which these parts are mounted.

Figure 6 is a cross sectional view taken on the line 6—6 of Figure 5.

Figure 7 is a detail perspective view of the film gate showing the exposure opening therein.

Figure 8 is a perspective view of the spring pressed platen showing the exposure opening and rib for engaging the perforated edge of the film and holding the film flat in the film gate.

Figure 9 is a detail perspective view of the shutter.

Figure 10 is a detail front elevation showing the catch for holding the spring controlled shutter open.

Figure 11 is a cross sectional view taken on the line 11—11 of Figure 2 showing the easel and paper support in front elevation.

Figure 12 is an elevation view showing the reverse side of the easel from that shown in Figure 11.

Referring now to the drawings in which like characters of reference designate similar parts in the various views, 10 designates the base of the projecting apparatus. An L-shaped plate 11, best shown in Figures 1 and 3, is secured to the base in any preferred manner. The long leg of the plate is provided with a bracket 12 which supports a lamp bulb 13 of low candle power, for example, three candlepower. Also secured to the plate are a pair of spindles 14 upon which guide rollers 15 are mounted, these rollers being located near the base plate and forming guides for a moving picture film 16. The film is wound off a supply reel 17 having its shaft 18 journaled in a hook-like flange 19 formed on the upper end of the upright leg 20 of a right angular bracket, the horizontal leg 21 of which is secured to the plate 11 and terminates in a hook-like flange 22 in which the shaft 23 of a take-up reel 24 for the film, is journaled.

The short leg 25 of the L-shaped plate is terminally provided with a socket member 26, best shown in Figures 1 and 3, which receives the barrel 27 of a projection lens 28, best shown in Figure 4.

A housing 29, having the rear side open, is provided with flanges 30, as best shown in Figures 1 and 3, which are secured to the long leg of the L-shaped plate by screws 31. Attached to the housing is a transformer 32 for stepping down the voltage of service lines to six or eight volts for supplying the electric bulb with current. The housing also carries the barrel 33 of a condensing lens 34 which is located directly in front of the lamp bulb 13 and is in axial alignment with the projection lens 28. A circular opening 35 is formed in the housing coaxial with the condensing lens 34, as best shown in Figure 6 and an opening 36 of similar size and shape is formed in a flanged box 37 which is secured to the housing in any preferred manner and forms a mounting for the film gate 38, shown in Figure 7.

The film gate consists of a substantially oblong metal strap having guide ribs 39 projecting forwardly from the vertical edges and having upper and lower arcuate lips 40 projecting from the upper and lower ends. The film passes down upon the front side of the gate between the guide ribs 39, entering the gate over the upper guide lip 40 and leaving the gate over the lower guide lip 40. An oblong slot 41 is formed centrally in the gate in axial registration with the opening 36 of the box and through the oblong slot 41 the image on a selected frame of the film is projected by the light rays.

A cruciform shaped platen 42 is provided with aligned arms 43 which pass through cut away portions 44 formed in the guide ribs 39. The platen is provided with aligned arms 45 at a right angle to the arms 43 and these arms are engaged between the guide ribs 39. A rib 46 is formed on the arms 45 and this rib rides upon the perforated edge portion of the film to hold the film in flat condition in the film gate while an exposure is being made. The arms 45 are provided with hair pin springs 47 which, as best shown in Figure 1, are engaged against the short leg 25 of the L-shaped plate 11, and urge the platen toward the film gate. An oblong slot 48 is formed in the platen at the center of intersection of the arms thereof and this slot registers with the slot 41 in the film gate to coact with the latter in projecting an image from a selected film frame.

A shutter 49, best shown in Figure 9, is provided with an integral lever 50 which is pivotally secured to the front wall of the housing 29 as shown at 51 in Figure 5. The lever projects beyond the housing and terminates in a laterally directed flange 52 over which a hook 53, shown in Figure 10, and pivoted at 54 on the side wall of the housing, may be engaged to hold the shutter open while focusing the projection lens and setting the easel in proper location to get the required size picture. As soon as the hook is disengaged from the flange 52 a spring 55, which is connected to a hook 56 on the shutter, and to the bottom wall of the box 37, returns the shutter to closed position against a stop pin 57, best shown in Figures 1 and 5.

A switch 65 located on the housing is used to control the current between the transformer and light. The housing is light-tight when the shutter is closed.

For supporting the sensitized paper a bar 58, best shown in Figures 1 and 2, is secured at the rear end to the base 10 through the medium of bolts 59. Slidably mounted on the bar is an easel best shown in Figures 11 and 12, to comprise a bracket arm 60 which is provided at the bottom with inturned guide flanges 61 which slidably receive edge portions of the bar 58 and permit of the bracket 60 being adjusted longitudinally of the bar.

An easel 62 is provided on the rear face with guide flanges 63 which engage the vertically disposed edges of the bracket arm 60 and permit of vertical adjustment of the easel on the bracket arm. An adjusting screw 64 is engaged through the bracket arm and bears against the rear face of the easel to secure the easel in various vertically adjusted positions on the bracket arm.

The easel is provided on the lower edge with a flange 66 which forms a ledge to support the sensitized paper sheet upon which the image is to be projected. A pair of vertically disposed paper guides 67 are disposed upon the front face of the easel, as shown in Figure 11, these guides having flanges 68 on the outer longitudinal edges to engage the vertical edges of the paper and hold the paper against lateral shifting movement. Adjusting screws 69, carried by paper guides, are engaged through transversely disposed slots 70 formed in the easel and permit the paper guides being secured in various adjusted positions equidistant from a center line 71 marked on the easel. A vertical scale 72 is marked on the center line and on the top edge of the easel a horizontal scale 73 is marked, these scales assisting the operator in properly locating the paper guides.

The front face of the easel is painted with aluminum or white paint to provide a surface upon which the projected image may be clearly seen.

For rewinding the film the spindles 18 and 23 of the reels are equipped with respective drive pulleys 74 and 75 over which a belt drive 76 from a driving pulley 77, may be selectively engaged to wind the film off one reel and wind it up on the other reel as desired.

The driving pulley 77 is equipped with a shaft 78 which is journaled in the L-shaped plate 11 and is equipped with a crank handle 79 through the medium of which the drive pulley may be turned.

In operation paper guides 67 on the easel 62 are adjusted to the desired width. The selected frame of the movie film is then centered with respect to the slots 41 and 48 in the film gate 38 and platen 42, respectively. The light 13 is energized by turning the switch 65 to "on" position, and while the shutter 49 is held in open position by means of the hook 53, the easel 62 is moved the proper horizontal distance from the lens 28 to give the required size picture, the easel also being located vertically so that the flange 66 coincides with the bottom of the projected image. Proper focus is then obtained by movement of the lens barrel 27 in socket member 26. Hook 53 is now disengaged and shutter is snapped into closed position by means of spring 55. Sensitized paper of the required size is placed on the easel and exposure is made by holding the shutter in open position by means of thumb or forefinger placed on flange 52. When correct exposure is made shutter is allowed to snap closed by removing finger.

From the above description it is thought that the construction and operation of the invention will be fully understood without further explanation.

What is claimed is:

1. Apparatus for making enlarged still prints from movie films, comprising the combination of a low candle power lamp, a light condensing lens in front of the lamp, a projection lens in axial alignment with and in front of the condensing lens, a spring closed shutter between both lenses, means for holding the shutter open to time the exposure, a film gate having longitudinal ribs for centering the film accurately with respect to both lenses, said ribs having a transversely cut away portion, a cruciform shaped platen having aligned arms engaged in said cut away portion and having aligned arms extending longitudinally of the gate, a rib on the last named aligned arms adapted to engage a marginal portion of the film and hold the film in flat condition on the gate, hair pin springs carried by the last named arms and tensioned to urge the platen constantly toward the gate, and an easel for supporting sensitized paper adapted to be adjusted toward and away from the projection lens.

2. Apparatus for making enlarged still prints from movie films comprising a support, an L-shaped plate on the support, a low candle power lamp carried by one leg of the plate, a housing secured to the plate, a light condensing lens secured to the housing in axial alignment with and in front of the lamp, a housing for the lamp and condensing lens connected to the first named leg of the support, a transformer in the housing for supplying the lamp with current, a projection lens carried by the housing in axial alignment with and in front of the condensing lens, a shutter pivoted on the housing and controlling the exposure, supply and takeup reels for a movie film supported by the first named leg of the L-shaped bracket, guide rollers for the film connected to said first named leg of the L-shaped bracket for training a film between said reels and across said condensing lens to dispose a frame thereof in position to be exposed by the shutter, and an easel for supporting sensitized paper adjustably connected to said support to dispose the paper in axial alignment with the projection lens and at a predetermined distance therefrom.

JAMES H. SIMMS.